(12) United States Patent  
Brendel

(10) Patent No.: US 7,900,040 B2  
(45) Date of Patent: *Mar. 1, 2011

(54) ATOMIC SESSION-START OPERATION COMBINING CLEAR-TEXT AND ENCRYPTED SESSIONS TO PROVIDE ID VISIBILITY TO MIDDLEWARE SUCH AS LOAD-BALANCERS

(76) Inventor: Juergen Brendel, Santa Clara, CA (US)

( * ) Notice: Subject to any disclaimer, the term of this patent is extended or adjusted under 35 U.S.C. 154(b) by 810 days.

This patent is subject to a terminal disclaimer.

(21) Appl. No.: 11/515,358

(22) Filed: Aug. 31, 2006

(65) Prior Publication Data

US 2007/0094373 A1 Apr. 26, 2007

Related U.S. Application Data

(63) Continuation of application No. 10/900,840, filed on Jul. 27, 2004, which is a continuation of application No. 09/388,319, filed on Sep. 1, 1999, now Pat. No. 6,772,333.

(51) Int. Cl.
*H04L 29/06* (2006.01)
*H04L 29/00* (2006.01)

(52) U.S. Cl. ......... 713/153; 713/150; 709/227; 709/223; 709/238; 709/225; 718/102; 718/105

(58) Field of Classification Search .................. None
See application file for complete search history.

(56) References Cited

U.S. PATENT DOCUMENTS

| | | | |
|---|---|---|---|
| 4,649,233 A | 3/1987 | Bass et al. | |
| 5,455,863 A | 10/1995 | Brown et al. | |
| 5,524,052 A | 6/1996 | Augustine et al. | |
| 5,671,279 A | 9/1997 | Elgamal | |
| 5,745,681 A | 4/1998 | Levine et al. | |
| 5,754,656 A | 5/1998 | Nishioka et al. | |
| 5,757,917 A | 5/1998 | Rose et al. | |
| 5,774,660 A | 6/1998 | Brendel et al. | |
| 5,796,952 A | 8/1998 | Davis et al. | |
| 5,805,803 A | 9/1998 | Birrell et al. | |

(Continued)

*Primary Examiner* — Syed A. Zia
(74) *Attorney, Agent, or Firm* — Sterne, Kessler, Goldstein & Fox P.L.L.C.

(57) ABSTRACT

A load-balancer assigns incoming requests to servers at a server farm. An atomic operation assigns both un-encrypted clear-text requests and encrypted requests from a client to the same server at the server farm. An encrypted session is started early by the atomic operation, before encryption is required. The atomic operation is initiated by a special, automatically loaded component on a web page. This component is referenced by code requiring that an encrypted session be used to retrieve the component. Keys and certificates are exchanged between a server and the client to establish the encrypted session. The server generates a secure-sockets-layer (SSL) session ID for the encrypted session. The server also generates a server-assignment cookie that identifies the server at the server farm. The server-assignment cookie is encrypted and sent to the client along with the SSL session ID. The Client decrypts the server-assignment cookie and stores it along with the SSL session ID. The load-balancer stores the SSL session ID along with a server assignment that identifies the server that generated the SSL session ID. When other encrypted requests are generated by the client to the server farm, they include the SSL session ID. The load-balancer uses the SSL session ID to send the requests to the assigned server. When the client sends a non-encrypted clear-text request to the server farm, it includes the decrypted server-assignment cookie. The load balancer parses the clear-text request to find the server-assignment cookie. The load-balancer then sends the request to the assigned server.

25 Claims, 8 Drawing Sheets

U.S. PATENT DOCUMENTS

| | | | |
|---|---|---|---|
| 5,826,242 A | 10/1998 | Montulli | |
| 5,848,161 A | 12/1998 | Luneau et al. | |
| 5,852,666 A | 12/1998 | Miller et al. | |
| 5,875,296 A * | 2/1999 | Shi et al. | 726/5 |
| 5,884,024 A | 3/1999 | Lim et al. | |
| 5,963,915 A | 10/1999 | Kirsch | |
| 6,006,264 A * | 12/1999 | Colby et al. | 709/226 |
| 6,023,722 A | 2/2000 | Colyer | |
| 6,041,357 A | 3/2000 | Kunzelman et al. | |
| 6,076,108 A * | 6/2000 | Courts et al. | 709/227 |
| 6,163,772 A | 12/2000 | Kramer et al. | |
| 6,560,717 B1 | 5/2003 | Scott et al. | |
| 6,606,708 B1 * | 8/2003 | Devine et al. | 726/8 |
| 6,772,333 B1 * | 8/2004 | Brendel | 713/153 |
| 6,801,949 B1 * | 10/2004 | Bruck et al. | 709/232 |
| 6,938,096 B1 * | 8/2005 | Greschler et al. | 709/239 |
| 6,985,953 B1 | 1/2006 | Sandhu et al. | |
| 7,050,424 B2 | 5/2006 | Cheng et al. | |
| 7,200,632 B1 * | 4/2007 | Greschler et al. | 709/203 |
| 7,296,076 B1 | 11/2007 | Portolani | |
| 7,298,746 B1 | 11/2007 | De La Iglesia et al. | |
| 7,321,926 B1 | 1/2008 | Zhang et al. | |
| 7,574,343 B2 * | 8/2009 | Levi et al. | 703/13 |
| 7,584,262 B1 | 9/2009 | Wang et al. | |
| 7,606,898 B1 * | 10/2009 | Hunt et al. | 709/225 |
| 7,613,822 B2 * | 11/2009 | Joy et al. | 709/235 |
| 7,650,393 B2 * | 1/2010 | Saika et al. | 709/219 |
| 7,720,763 B2 | 5/2010 | Campbell et al. | |
| 7,730,089 B2 * | 6/2010 | Campbell et al. | 707/781 |
| 2001/0052024 A1 * | 12/2001 | Devarakonda et al. | 709/238 |
| 2002/0120743 A1 | 8/2002 | Shabtay et al. | |
| 2004/0264481 A1 * | 12/2004 | Darling et al. | 370/401 |
| 2005/0010670 A1 * | 1/2005 | Greschler et al. | 709/227 |
| 2005/0010754 A1 | 1/2005 | Brendel | |
| 2007/0094373 A1 | 4/2007 | Brendel | 709/223 |
| 2007/0106741 A1 * | 5/2007 | Christoff et al. | 709/206 |
| 2009/0094372 A1 * | 4/2009 | Nyang et al. | 709/229 |

* cited by examiner

WELCOME TO eBUY!

eBUY IS COMMITTED TO SERVING YOU, THE CUSTOMER, BY MAKING YOUR BUYING EXPERIENCE A PLEASANT ONE.

76

SEARCH OUR CATALOG --> [ 78 ]
(ENTER KEYWORDS)

76  76

SHIPPING INFO    ABOUT US

80

ATOMIC SESSION-START OPERATION COMBINING CLEAR-TEXT AND ENCRYPTED SESSIONS TO PROVIDE ID VISIBILITY TO MIDDLEWARE SUCH AS LOAD-BALANCERS

CROSS-REFERENCE TO RELATED APPLICATIONS

This application is a continuation of U.S. patent application Ser. No. 10/900,840, filed on Jul. 27, 2004, which is a continuation of U.S. patent application Ser. No. 09/388,319 filed on Sep. 1, 1999, now U.S. Pat. No. 6,772,333 B1, entitled "Atomic Session-Start Operation Combining Clear-Text And Encrypted Sessions To Provide Id Visibility To Middleware Such As Load-Balancers", all of the above applications are hereby expressly incorporated by reference for all purposes.

FIELD OF THE INVENTION

This invention relates to multi-server web sites, and more particularly to load-balancing among servers when both encrypted and un-encrypted connections occur.

BACKGROUND OF THE INVENTION

Today's rising popularity of the Internet has encouraged many companies to do business over the Internet. Most Internet transactions are conducted through ubiquitous web-browsers and web-servers using the hyper-text-transfer protocol (HTTP), which is the technical foundation that the World Wide Web (WWW) is built on. Security and privacy concerns have led to the encryption of many transactions between the web browsers (clients) and the computers of the web-sites (servers). These encrypted transactions are often of a financial nature, such as ordering items with a credit card, checking account balances, etc.

Common encryption methods in use today are resource-intensive. Many network packets are exchanged between the two communication end-points to establish a secure session. The encryption and decryption algorithms used are processor-intensive for both client and server computers. Although the performance drop on a single client machine might not be noticeable, servers that handle many simultaneous connections can suffer a significant performance degradation, perhaps even becoming unavailable at high load levels.

Both Encrypted and Clear-Text Connections

The load on the server machine can be reduced by limiting the amount of data that is encrypted before being sent over the Internet. Less critical data such as product descriptions and advertisements can be sent as non-encrypted data, while only the more critical data such as credit-card numbers are encrypted. The non-encrypted or clear-text data can be sent using standard or clear-text TCP/IP connections while the encrypted data is sent using an encrypted session.

FIG. 1 shows a user communicating to a server using many clear-text connections and one encrypted session, which itself consists of multiple encrypted TCP connections. In this example, the overall client-encounter between the user and a server consists of the encrypted session and one or more clear-text connections. Initially, a user connects to a is server with clear-text connection 1, which is the start of the client-encounter. The user also makes a second connection, clear-text connection 2. This often happens automatically, when the browser is downloading multiple images that are embedded in the web page. Once the user decides to buy a product, types in his credit card information, and presses a 'submit' button, an encrypted session (session 3) begins with encrypted connection 1. Other clear-text connections (clear text connection 3) for non-critical information may be started or in progress. Finally, the user completes the purchase from encrypted session 3 via the encrypted session using encrypted connection 2.

Different connections between the client and server machines are made for exchanging clear-text and encrypted data. The encrypted connections are typically grouped together into a single encrypted session that shares the same keys and certificates. The various connections and sessions often overlap in time, and can begin and end without regard to each other.

A typical electronic-commerce (e-commerce) web site might send all product or catalog information as clear text, while starting an encrypted session only at check-out when the user is ready to input his credit card information. Products selected during the browsing of the catalog with the clear-text connections might be saved in a server-side database and later retrieved when the user checks out.

Load-Balancing—FIG. 2

Web sites can experience enormous growth, as some have seen the number of unique customers rise from zero to over a million in less than one year. A single server machine is not able to simultaneously handle millions of customer requests, so additional server machines are often added to the web site. The web site is then known as a web or server farm. A server farm can have hundreds of individual server machines that are connected together by a local network such as a LAN.

FIG. 2 highlights load-balancing at a server farm. Requests from clients are received by an internet connection and sent to load-balancer 10. Load-balancer 10 then assigns the request to one of many servers 8. The assigned server 8 then receives the request and processes it. The reply from server 8 can be sent directly back to the client through the internet connection for the server farm. The server farm can use a single virtual IP address and thus appears to the outside user to be a single server.

Some load-balancers assign requests to servers randomly or in a predefined sequence, while others assign new requests to the least-busy servers. More powerful load-balancers can look inside the IP packets, which make up TCP connections to find application information, such as the session ID used to identify the encrypted session. The load-balancer can also keep a table of session ID's read from the packets so that all connections carrying the same session ID are sent to the same server. The individual packets of a TCP connection are also sent to the same server, using the information provided in the packet headers, such as the client and server IP addresses and ports. See U.S. Pat. No. 5,774,660 by Brendel et al. for "A World-Wide-Web Server with Delayed Resource-Binding for Resource-Based Load Balancing on a Distributed-Resource Multi-Node Network", which is assigned to Resonate Inc. of Mountain View, Calif.

Load-balancer 10 can be a hardware or software module. Since load-balancer 10 sits between servers 8 and the user, load-balancer 10 is one kind of middleware that intercepts IP packets. Other kinds of middleware are used for network management such as quality-of-service (QOS) or security. Middleware can only look at the IP packets being sent and does not necessarily know which connections and sessions belong to the same user.

It is desirable for all connections for a certain user to be assigned to the same server. When the same server receives all of the user's connections, then local traffic to other servers is minimized and latency is reduced. When different servers process requests by the same user, the different servers may have to communicate with each other to process the requests, such as a server processing a checkout request that may need item information from other servers used by the user. Such inter-server communication would increase local network traffic and require additional programming and configuration.

Ideally, load-balancer 10 assigns all requests from a certain user to the same server, whether the requests are encrypted or clear-text. Load-balancer 10 can assign all packets for a certain connection to the same server, but typically the server closes the connection after each HTTP request is processed. Thus a new connection is used for each web page displayed, while simultaneously one or more encrypted sessions may also be ongoing. Since load-balancer 10 is middleware, it is not able to directly associate the different encrypted sessions and clear-text connections with the same user.

Cookies—FIGS. 3A, 3B

FIG. 3A shows a cookie being passed containing a server assignment. After a connection is established between the client and the server farm, the client sends a request to the server farm using the HTTP protocol. This request contains a request header that contains a GET statement. The GET statement identifies a resource such as a web page that the client is requesting. In the example of FIG. 3A, request 12 asks for /page.html, which is a web page at the server farm. The request typically identifies the web page or resource with a uniform-resource-locator (URL).

The server replies by sending response header 14, which contains information on the server and the type of data being sent. Then content 16 is sent from the server to the client. The server typically closes the connection once the content has been sent. A new network connection is typically required for each page of content requested.

Response header 14 also contains state information known as a cookie. Cookies are generated by a server and sent to the client. The client stores the cookie in a local file. Cookies allow servers to store state information such as a user name, customer number, or items ordered but not yet checked out. Cookies are useful to the user since the user's name or customer number does not have to be typed in each time the web site is browsed. When the user browses to a new web site, the cookies on the client are searched. Any cookies with a domain-name address (a high-level part of the URL) matching that of the new web site is sent to the server.

Response header 14 contains a cookie. The statement "set-cookie: ID=123" causes a cookie to be stored on the client once the response header is received. The stored cookie contains the statement "ID=123". This could be a user or customer ID assigned to the user.

In FIG. 3B, a later request sends a cookie back to the server. Perhaps a few minutes or perhaps several weeks later, the user sends another request to the server. Once a connection is established, request header 18 is sent to the server. Request header 18 contains the requested URL, /page.html. The domain address for this URL is compared to the stored cookies and a match is found. The matching cookie is also sent with request header 18. The matching cookie was the cookie that was earlier stored on the client from response header 14 of FIG. 3A. The statement "cookie: ID=123" in request header 18 is the cookie sent to the server, indicating that the user's customer ID is 123.

The server then uses the cookie to lookup the user's account information. The server can customize the content page returned to the client, such as by greeting the user by his name, or displaying a weather report for the city the user lives in. Content 22 is then sent from the server to the client and the connection is closed by the server.

SSL Encryption—FIG. 4

FIG. 4 shows a model for network communication with SSL encryption. The current de-facto standard for encryption on the Internet is currently secure-sockets layer (SSL) version 3.0. User requests from web browser 30 are converted to HTTP protocol 28 in the form of request headers, typically with GET commands. These requests are converted into IP packets by TCP/IP layer 24 and sent over the internet to the server machine's TCP/IP layer 34. TCP/IP layer 24 first makes a connection with server TCP/IP layer 24 by exchanging IP packets.

The server TCP/IP layer 24 receives the IP packets and sends the information received up to the server HTTP layer 38. The HTTP requests are then sent to web server 32 which assembles the web page or other resource. This content is then sent back down the server stack through HTTP layer 38 and TCP/IP layer 24 to the client.

When web-browser 30 requests a SSL resource, SSL encryption 26 is called by HTTP protocol 28. SSL encryption 26 then encrypts the request and sends encrypted data to TCP/IP layer 24. Thus the data is encrypted by inserting SSL encryption 26 between HTTP protocol 28 and TCP/IP layer 24. Likewise, when a SSL resource is sent by web server 32, SSL encryption 26 is called to encrypt the content from HTTP layer 38 before being sent to TCP/IP layer 34. Clear-text data bypasses SSL encryption 26, 36, while encrypted data that is received is sent to SSL encryption 26, 36 for decryption before being passed up to web browser 30 or web server 32.

SSL encryption 26, 36 exchange encryption keys and certificates with each other when an encrypted session is established. A pseudo-connection between the SSL encryption layers is thus made using the services of the lower TCP/IP layers 24, 34. Likewise, a pseudo-connection between the HTTP protocol layers is made using TCP/IP layers 24, 34 and SSL encryption 26, 26 for encrypted data.

SSL Session ID—FIGS. 5A, 5B

FIG. 5A shows the establishment of a SSL session. The client sends a message known as client hello 40. Client hello 40 does not specify a SSL session ID. The server sees client hello 40 as a new session request and sends server hello 42 to the client with a unique server-generated SSL session ID and the server's keys and certificates. The SSL session ID is generated by the web server's SSL module. The client responds with message 41 which include the SSL session ID assigned by the server in server hello 42. The client includes it's keys and certificates in message 41. Additional messages may be exchanged beyond what is shown in this simplified example. These additional messages may include keys and certificates needed before data can be encrypted.

The SSL protocol establishes a secure connection between the two communication end-points, the client and server. An elaborate exchange of certificates and keys precedes each new SSL session. This is time and computing intensive. To reduce the performance impact, the key and certificate exchange only needs to be performed once at the beginning of an SSL session. Once the trust between the two parties has been established, the SSL session ID is used to identify further network-connections belonging to the same session. For SSL version 3, the session ID itself is transmitted unencrypted between client and server.

FIG. 5B shows a subsequent SSL request. The client makes another request to the server after an SSL session has been established and all keys and certificates have been exchanged, as shown in FIG. 5A. Since the client already knows the SSL session ID, it includes it in the first SSL message, client hello 44. All subsequent connections that belong to this session also include the SSL session ID. If the server's SSL module still remembers this SSL session ID, it accepts this connection without any further establishment of trust. The server simply responds with server hello 46 that also includes the SSL session ID. If the server has timed out, a new SSL session is started and assigned a new session ID.

Load-Balancer Could Read SSL Session ID and Cookies

The load-balancer could use the client's IP address to assign all incoming packets from the client to a particular server. However the client's apparent IP address may actually change from connection to connection if the client's company or ISP uses distributed gateways or proxies to connect to the internet. In this case, the client's apparent IP address is the IP address of the gateway that the connection was routed through and individual connections from one client may be routed through different gateways. The result is that individual connections from the same client can come from different IP addresses. Furthermore, multiple clients may reside on the same computer or multiple computers may be routed through one gateway. Since different connections from one client may come from different IP addresses or multiple clients may come from the same IP address, the client's IP address cannot be used for load-balancing.

A load-balancer that is application-aware could look inside IP packets being transmitted to read the data payload for useful information. For example, a load-balancer could read the SSL session ID, and send all incoming packets with a certain SSL session ID to a particular server. A load-balancer could also look for cookies inside packets. If the cookies included the server ID, then the load-balancer could assign incoming request packets to the particular server indicated in the cookie.

Unfortunately, the load-balancer cannot recognize that a particular clear-text connection is associated with an ongoing encrypted session. Clients can generate both clear-text and encrypted sessions, as shown in FIG. 1, as part of the same client-encounter. It is desirable for the load-balancer to assign all connections from one client to the same server, whether the connections are encrypted or clear-text.

What is desired is a load-balancer that can assign all sessions and connections from a particular client to the same server. It is desired to assign both clear-text connections and encrypted sessions to the same server once state has been established by a cookie. It is desired that the load-balancer distribute traffic as evenly as possible among the available servers, but not assign clear-text and encrypted connections from one client-encounter to different servers after state-establishment. A load-balancer for e-commerce web sites is desired that assigns both clear-text connections and connections for encrypted sessions from one client to a same server. It is desired to allow clear-text connections to be assigned to any server until a state is established, but to direct all subsequent clear-text and encrypted connections to a same server once a state has been set.

SUMMARY OF THE INVENTION

A server farm assigns both clear-text and encrypted-session requests from a client to an assigned server. The server farm has a plurality of servers that include the assigned server. The plurality of servers sends web pages to clients. The web pages include clear-text web pages that are transmitted as non-encrypted clear-text data and web pages that are transmitted as encrypted data.

A load-balancer receives requests from clients. It distributes the requests to the plurality of servers. The load-balancer determines the assigned server in the plurality of servers by parsing a clear-text request for a server-assignment cookie. The server-assignment cookie indicates which server in the plurality of servers has previously been assigned to respond to requests from the client that generated the request.

The load-balancer may also determine the assigned server in the plurality of servers by matching an encrypted-session identifier contained in the request for an encrypted page to an encrypted-session identifier table-entry identifying which server in the plurality of servers has previously been assigned to respond to an encrypted-session request from the client that generated the request.

A network connection connects the load-balancer to receive the requests from the clients, and sends responses from the plurality of servers to the clients. Thus load balancing among the plurality of servers is determined by the server-assignment cookie for clear-text requests, but determined by the encrypted-session identifier for encrypted-session requests.

In further aspects an atomic server-assignment operation generates the server-assignment cookie indicating that the server is assigned to receive requests from a client. The atomic server-assignment operation generates the encrypted-session identifier used by the load-balancer to identify the server. An atomic transmit means receives the server-assignment cookie and the encrypted-session identifier from the atomic server-assignment operation. It transmits the encrypted-session identifier and the server-assignment cookie to the client through the network connection. The client stores the server-assignment cookie and stores the encrypted-session identifier. The client sends the server-assignment cookie but not the encrypted-session identifier with each clear-text request to the server farm. The client sends the encrypted-session identifier with each encrypted-session request to the server farm. Thus the atomic server-assignment operation sets a server assignment for both clear-text requests and encrypted-session requests.

In other aspects of the invention the server-assignment cookie is encrypted when the atomic transmit means transmits the encrypted-session identifier and the server-assignment cookie to the client, but the encrypted-session identifier is not encrypted. Thus the load-balancer can read the encrypted-session identifier but cannot read the server-assignment cookie for encrypted-session requests.

In still further aspects, after the atomic server-assignment operation, the encrypted-session request from the client contains the server-assignment cookie that is encrypted and not readable by the load-balancer. The encrypted-session request contains the encrypted-session identifier that is readable by the load-balancer.

In other aspects the atomic server-assignment operation is initiated by a reference to an encrypted component on a clear-text web page. The encrypted component generates an encrypted-session request from the client that contains no encrypted-session identifier. A web browser that generates a warning message when a clear-text web page is referenced from an encrypted-session web page does not generate the warning message when the encrypted component is referenced. Thus the warning message from the web browser is avoided when an encrypted session begins.

In further aspects the encrypted component is an image file that is not visible to a user.

DETAILED DESCRIPTION

The present invention relates to an improvement in server load balancing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that a load balancer or other middleware can assign connections belonging to the same encrypted session to the same server based on the secure-sockets-layer (SSL) session ID. Since all encrypted connections for one client share the same SSL session ID, all encrypted messages are sent to the correct server. The load-balancer can also examine cookies in clear-text messages. A special load-balancing cookie can be sent to the client. This special load-balancing cookie contains a server assignment statement that tells the load-balancer which server to send the message to. Since the client sends the special cookie with all subsequent requests, these subsequent clear-text request are assigned to the server identified by the special cookie.

The inventor has further realized that an atomic operation can be used to assign the server for load-balancing. This atomic operation:

1. Generates and sets the SSL session ID on the client and on the load-balancer
2. Generates and sets the special cookie with the server assignment.

The atomic operation ensures that the server assignment in the special cookie matches the server assignment for the SSL session ID. The server that generates the SSL session ID is the server assigned future connections. The atomic operation is an encrypted SSL operation, so the special cookie is encrypted before being sent to the client. The load-balancer cannot read encrypted cookies, so the load-balancer can only store the SSL session ID's server assignment. However, the client can decrypt the cookie and store it.

Subsequent clear-text requests from the client send the cookie containing the server assignment. Since these later requests are clear-text, the cookie is not encrypted. The load-balancer can thus read the cookie and use the server assignment from the cookie.

Once the atomic operation sets the server assignment, all clear-text connections are assigned by the load-balancer reading the special cookie, while all encrypted connections are assigned by the SSL session ID. Since the SSL session ID is not encrypted, it can be read by the load-balancer middleware. The load-balancer then looks up the SSL session ID in a table and reads out the assigned server.

Figure 6:
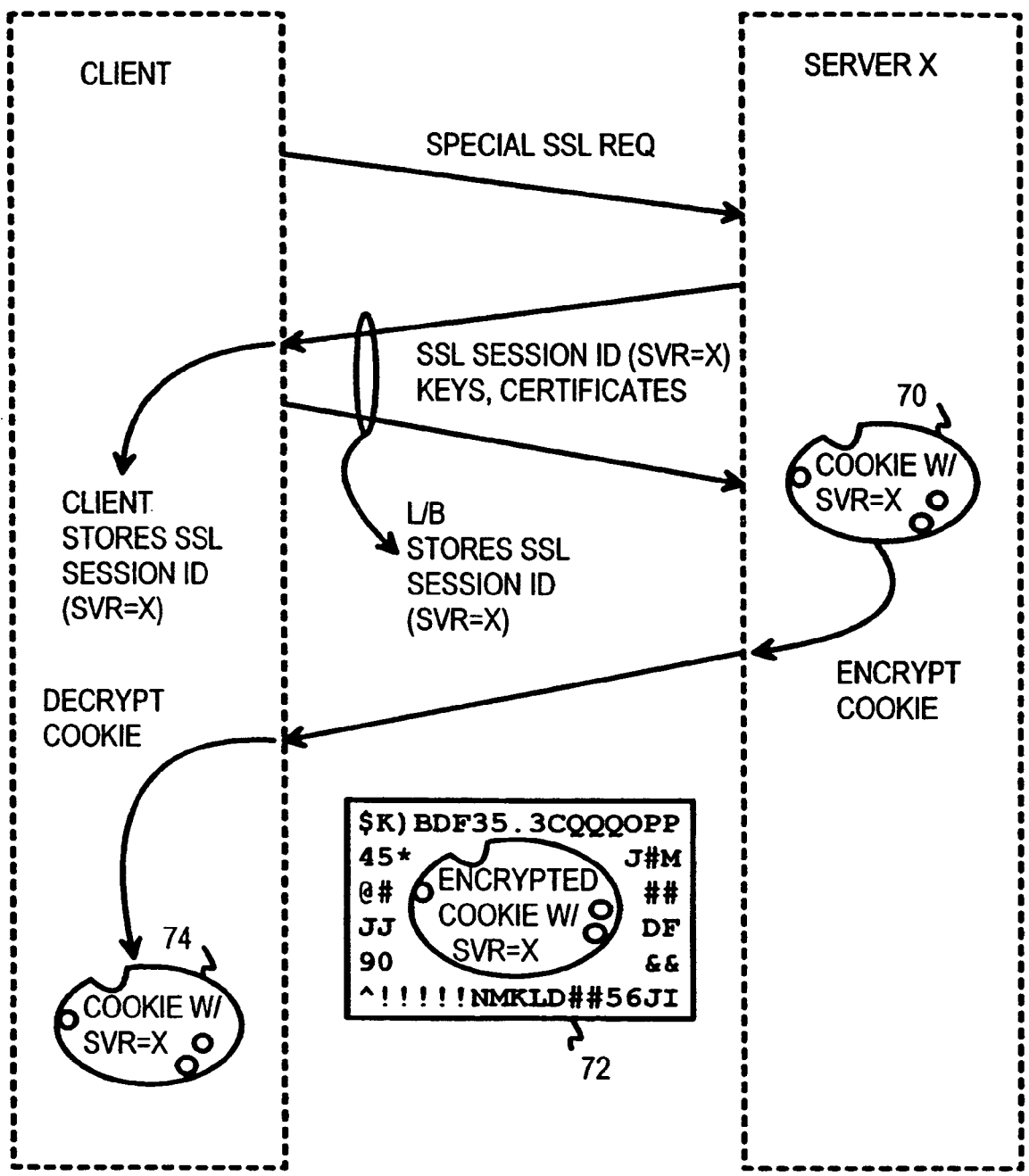
FIG. 6 highlights an atomic operation that sets the server assignment for both clear-text and encrypted connections between a client and a server.

Atomic Server-Assignment Operation—FIG. 6

FIG. 6 highlights an atomic operation that sets the server assignment for both clear-text and encrypted connections between a client and a server. The client sends a SSL request for a special encrypted element. In a preferred embodiment, this special encrypted element is an embedded component on a web page, such as an image or a hidden (invisible) image. Hidden images are particularly easy to add to existing web pages since they do not alter the visible page layout. The source code for this embedded component on the web page specifies that SSL must be used to send the component (image) to the client.

Since the special embedded component is encrypted, an encryption session is started. The client and server exchange encryption keys and certificates to establish an encrypted connection. A SSL session ID is generated by the server and is sent from the server to the client during session establishment. The load-balancer intercepts packets from the server and reads the SSL session ID. It looks up this SSL session ID in a table but cannot find a match. Thus a new entry is made in the table. The new entry contains the SSL session ID, and the IP address of the server, which is also present in the packets. Thus the load-balancer associates the SSL session ID with the server that generated the SSL session ID, server X. The client also stores the SSL session ID and uses it for all encrypted connections with the server. All encrypted connections from the client to the server have the SSL session ID in one of the first packets of the connection, stored in an unencrypted field that is readable by the load-balancer, even though the data payload is encrypted.

The server also generates assignment cookie 70 as part of the atomic operation which also generated the SSL session ID. Assignment cookie 70 contains a statement that identifies this server to the load-balancer. For example, all assignment cookies from server X contain a statement that the server=X. The load-balancer knows that X refers to this particular server machine. Assignment cookie 70 can contain the actual IP address of the server machine, or a simple designation such as 15, indicating to the load balancer that the server is server #15 in the server farm or any other means by which the load-balancer can uniquely identify a server.

Once an encrypted connection has been established between the server and client, the server uses the encryption key agreed on by the client and server to encrypt assignment cookie 70. Encryption produces encrypted cookie 72, which is embedded in an encrypted data payload. Assignment cookie 70 may be one of several data items in the data payload of an HTTP message that are encrypted together, and the encrypted payload can be divided into several IP packets if necessary. Server X then sends encrypted cookie 72 to the client The client receives encrypted cookie 72 and decrypts it using the agreed-on keys. The decrypted assignment cookie 74 is recovered and stored on the client machine. This decrypted assignment cookie 74 contains the server assignment from the atomic operation in the server.

The client sends decrypted assignment cookie 74 with later requests that are not encrypted. The load-balancer can read the clear-text assignment cookie and assign the clear-text messages to server X. If the client sends an encrypted message back to the server, it uses the SSL session ID that is stored earlier. The load balancer can read the SSL session ID and assign the message to the server based on the entry stored in the table. Thus the server is assigned for both clear-text and encrypted connections by the atomic operation SSL Load-Balancer Table—FIG. 7

Figure 1:
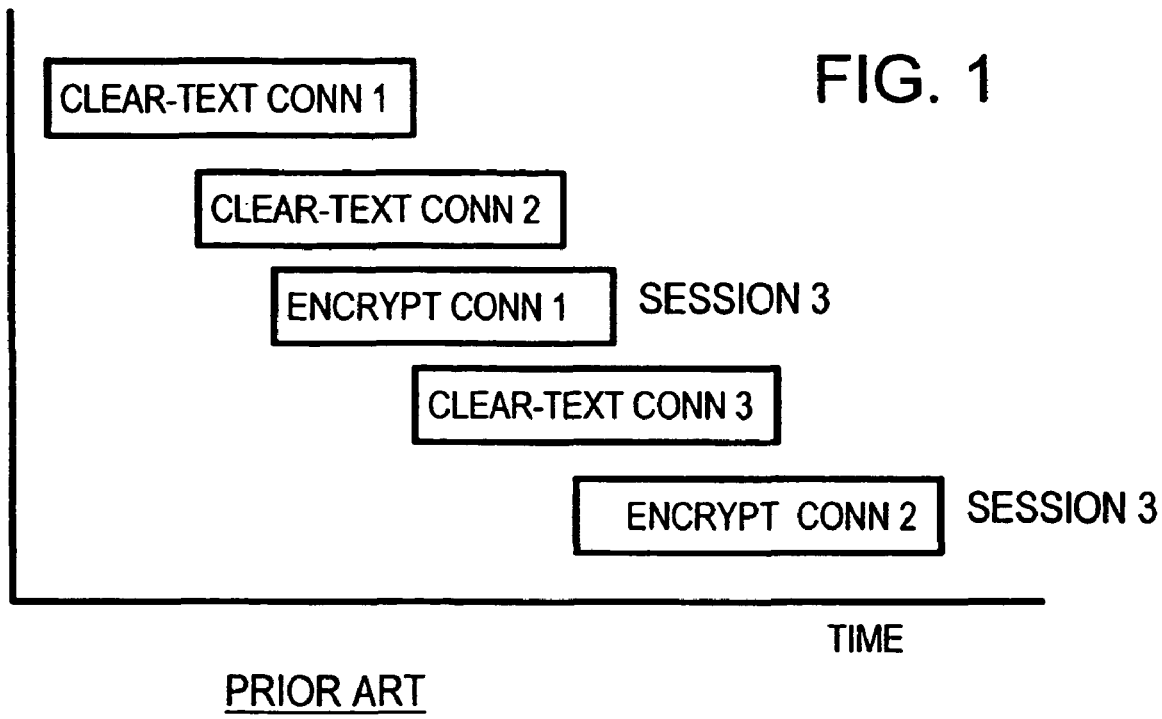
FIG. 1 shows a user communicating to a server using many clear-text connections and an encrypted session.
Figure 2:
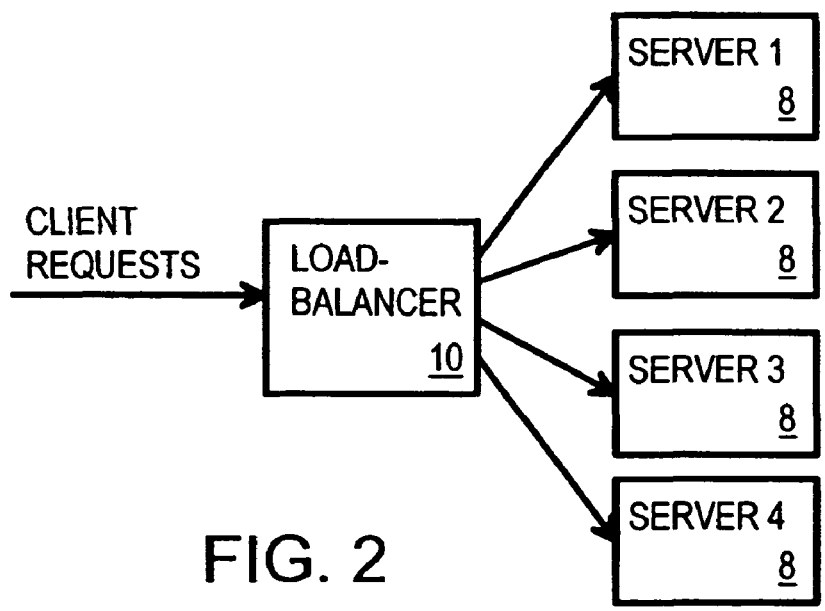
FIG. 2 highlights load-balancing at a server farm.
Figure 3A:
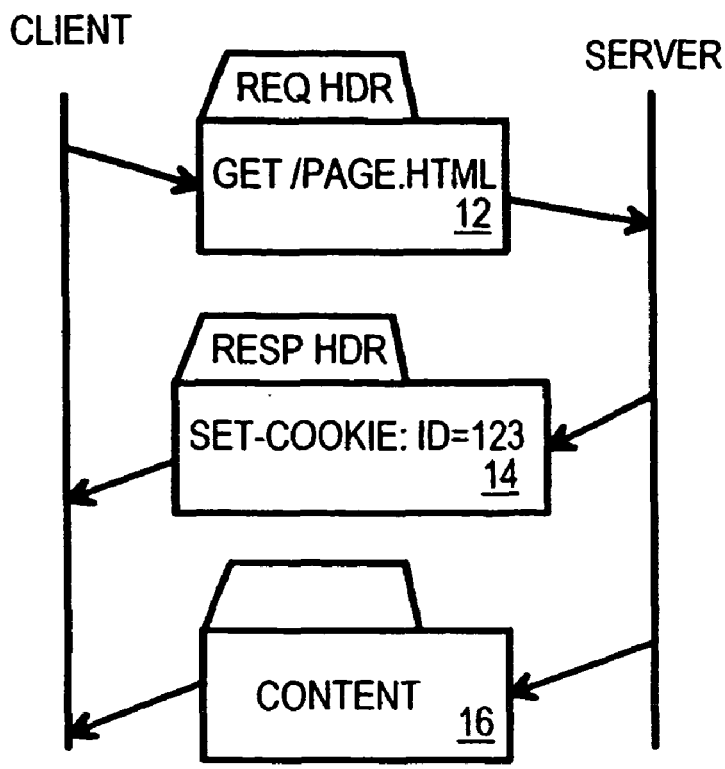
FIG. 3A shows a cookie being passed containing a server assignment.
Figure 3B:
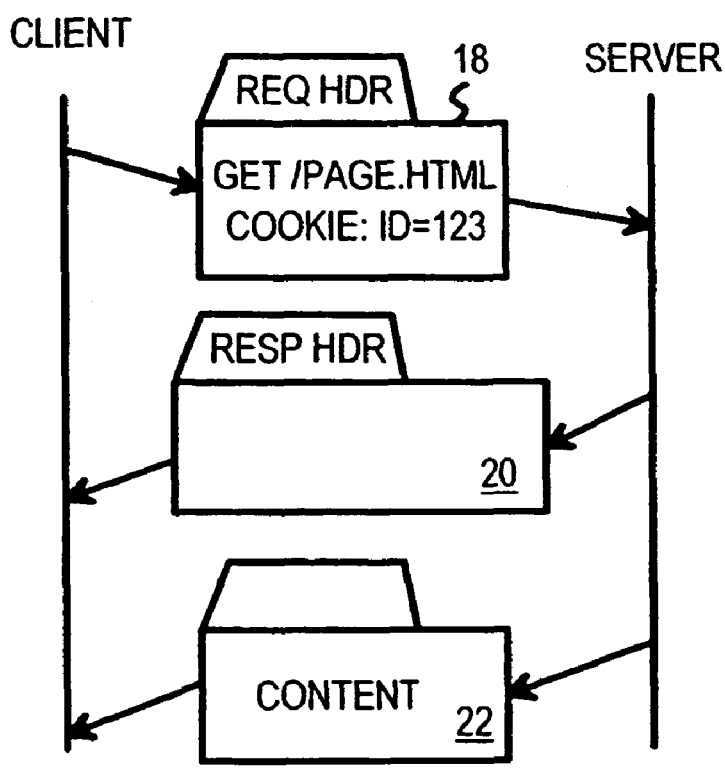
FIG. 3B shows a later request sending a cookie back to the server.
Figure 4:
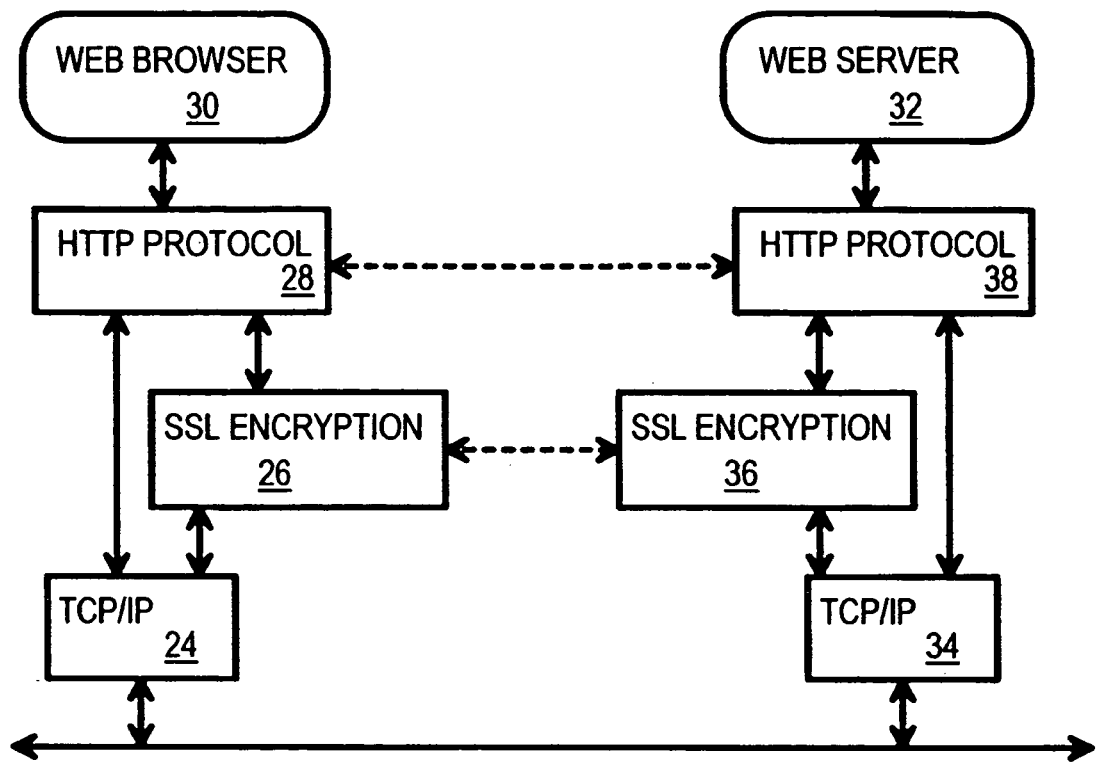
FIG. 4 shows a model for network communication with SSL encryption.
Figure 7:
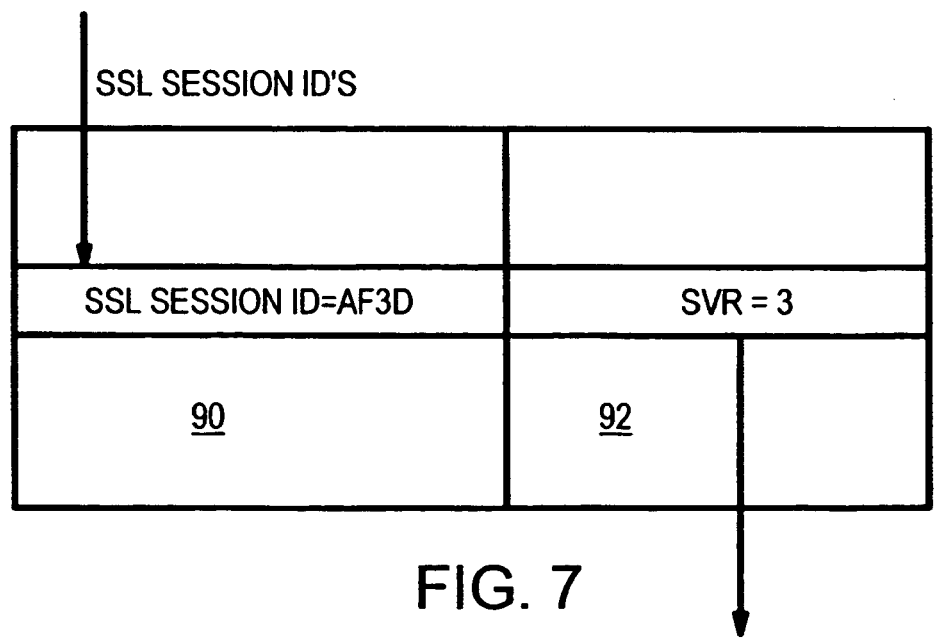
FIG. 7 shows a table in the load-balancer that assigns the server based on the SSL session ID.
Figure 5A:
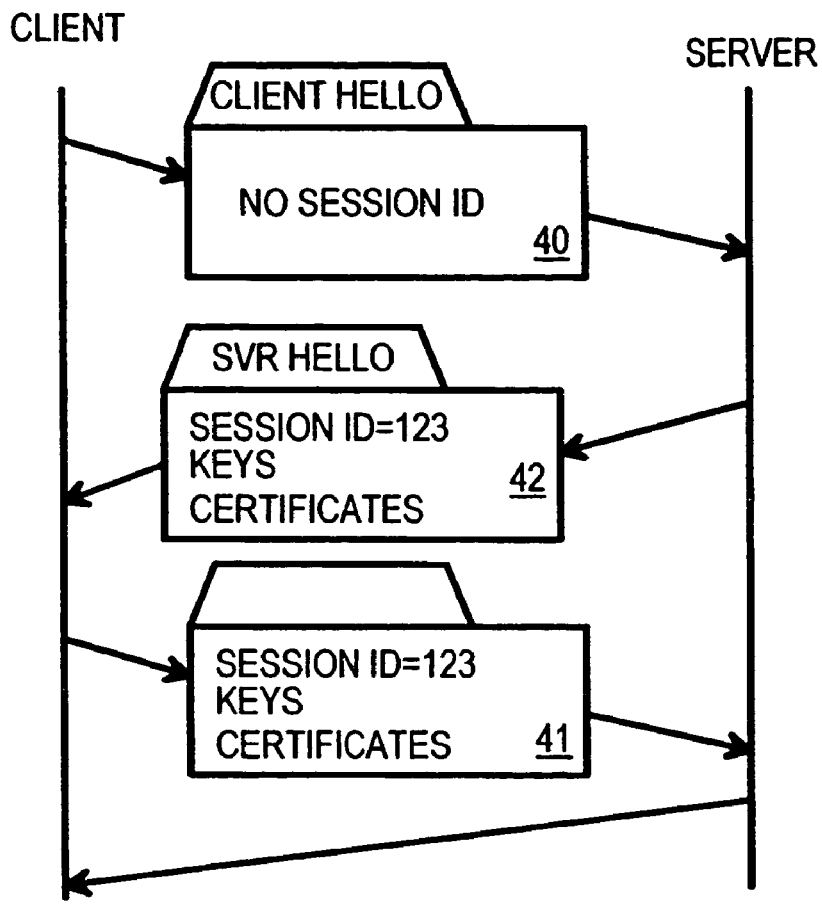
FIG. 5A shows the establishment of a SSL session.
Figure 5B:
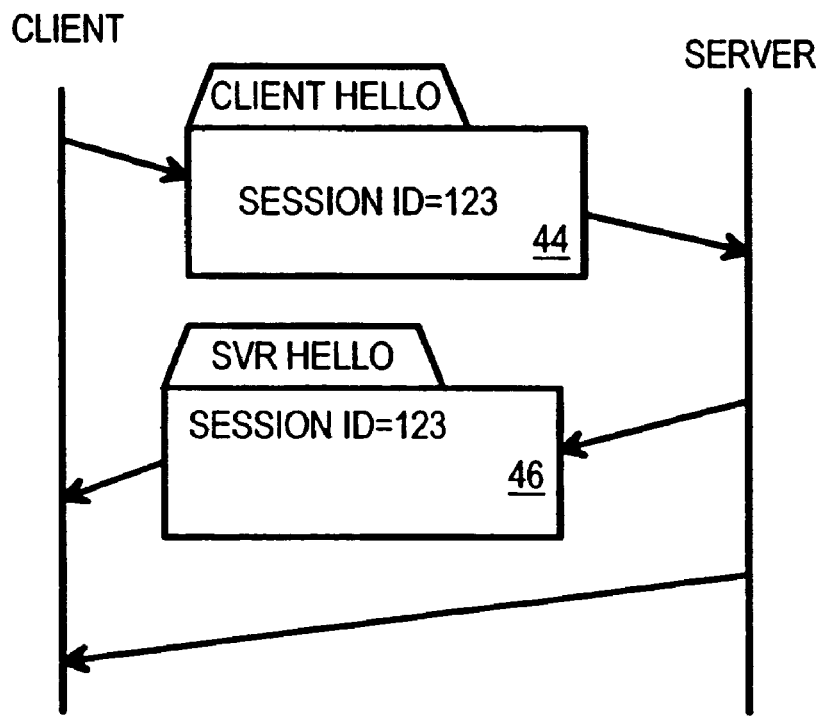
FIG. 5B shows a subsequent SSL request.

FIG. 7 shows a table in the load-balancer that assigns the server based on the SSL session ID. The load-balancer reads incoming packets and extracts the SSL session ID for encrypted sessions. The load-balancer will attempt to find the SSL session entry for this ID in its SSL session table using SSL ID field 90. When an entry has a SSL ID field that matches the SSL session ID extracted from the packet, the server assignment field 92 for that entry is read out of the table. Server assignment field 92 contains an identifier such as a MAC or IP address, or a simple server-farm identifier for the assigned server.

The SSL table is used only for the assignment of encrypted connections. Clear-text connections are load-balanced by reading an assignment cookie within the packet, or by default load-balancing when no assignment cookie is found. When a first encrypted connection, which does not contain an SSL session ID yet, is received by the load-balancer for a new SSL session, the server-generated SSL session ID is returned within that same connection and is stored by the load balancer in a new entry in the table, along with the server assignment. This assignment can either be determined from the connection entry of this TCP connection or from the source IP address of the server which generated the SSL session ID. The initial server assignment was freely determined according to other criteria, e.g. the server's CPU load.

Figure 8:
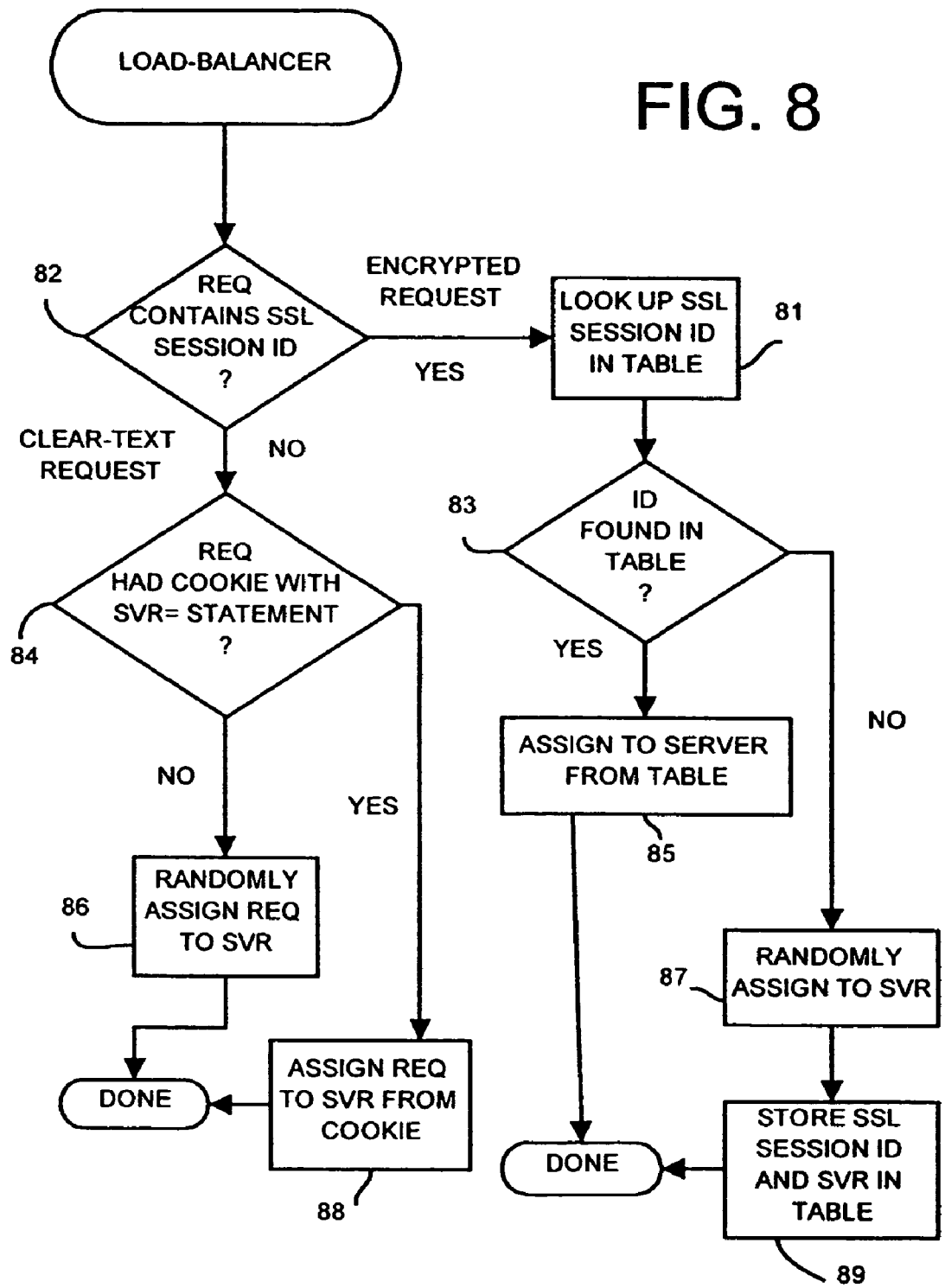
FIG. 8 is a flowchart indicating load-balancing for clear-text and encrypted connections that are assigned to the same server.

Load-Balancer Flowchart—FIG. 8

FIG. 8 is a flowchart indicating load-balancing for clear-text and encrypted connections that are assigned to the same server. The load-balancer is activated when a connection is received by the web farm from the network. The load-balancer parses the incoming request data for a SSL session ID field, step 82. If the connection is not encrypted, the SSL session ID field does not exist, and the load-balancer proceeds to step 84, since the connection is clear-text.

Step 84 parses the request data for a cookie. The cookie is identified by a "cookie:" text string in the HTTP message. If the special load-balancing cookie is found, the load-balancer assigns the connection to the server identified by the cookie. The server assignment is either specified as a value of the cookie or it is encoded in the cookie itself. Examples are: 'lb_cookie=server 3' or 'lb_cookie_server_3'. In the first case the value identifies the server, in the latter case the server is specified in the cookie-name itself. The server assignment based on finding a load-balancing-server in the cookie is performed by step 88.

When step 84 does not find a cookie with a server-assignment parameter, then the default or random load-balancing is performed, step 86. The packet can be assigned to the least-busy server, or to any server at random at the site. The assignment is "random" with respect to the cookie or SSL session ID since neither is used. Other load-balancing algorithms can be used to determine the server assignment, such as parsing the HTTP message for a URL or resource request or sending the request to the least-busy server.

When step 82 finds a SSL session ID in the request data of the connection, the connection is part of an encrypted session. Even if a cookie were present in the data, it cannot be used for load-balancing since it is encrypted, preventing the load-balancer from reading the server assignment in the cookie.

The SSL session ID found in step 82 is extracted from the incoming request data and is compared to the SSL session IDs stored in the table, step 81. If a matching SSL session ID is found, step 83, the server assignment in the matching entry is read out of the table. This server assignment from the table is used to direct the incoming connection to the assigned server, step 85. All connections for an encrypted session are thus directed to the same server, according to the assignment stored in the SSL table in the load-balancer.

When no matching SSL session ID is found in the table, step 83, then the connection is for a new SSL session. The server is assigned using the default load-balancing method, whether random, least-used, or some other assignment method, step 87. The server-generated SSL session ID, which is then returned from the server in the same connection as part of the response to the encrypted client request, is stored in a new or empty entry in the table, along with the server the connection was assigned to, step 89. Thus the new server assignment for the SSL session is stored in the table. Subsequent connections having the same SSL session ID will be directed to the same server, ensuring that all connections for the encrypted session are processed by the same server.

Figure 9:
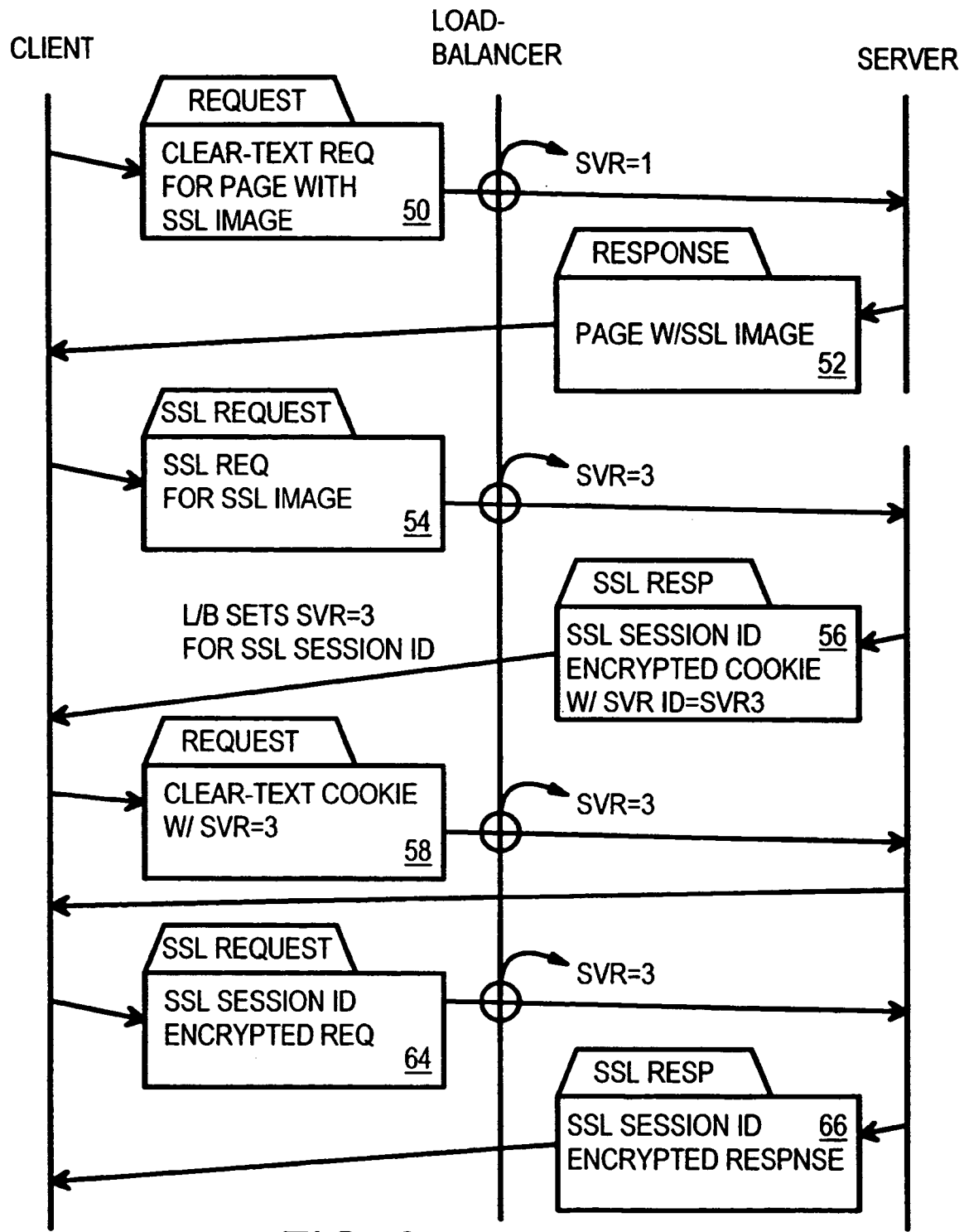
FIG. 9 is an example of an atomic operation that assigns a server to a client for both clear-text and encrypted connections.

E-Commerce Example—FIG. 9

FIG. 9 is an example of an atomic operation that assigns a server to a client for both clear-text and encrypted connections. A typical e-commerce web site provides clear-text web pages to users that show and describe products (catalog pages). The user can select a product for purchase by checking a check box or button on the product description page or a page with a list of products. Often the user continues to browse other products after a product has been selected for purchase. The selected product is put into a database maintained on the server, while the user continues to browse, perhaps adding other items to his "shopping cart".

Eventually the user is ready for check-out, and clicks a "buy now" or other button to finish the purchase. The user then begins an encrypted session and is asked to enter the credit card or other payment and shipping instructions. The purchase is finally confirmed, perhaps after the credit card account or credit limit is confirmed.

Rather than begin the encrypted session late in the buying sequence, when the user enters checkout, the invention begins the encrypted session early, before the user selects the first product. Thus the encrypted session begins before the first item is placed into the shopping cart, or as the first item is added to the shopping cart. The encrypted session is already on-going by the time the user reaches checkout.

The encrypted session is started early, using the atomic operation. The atomic operation can be initiated by the first product catalog page, or when the first item is added to the shopping cart, or even by the first page the user views, such as the home page. After the atomic operation assigns the server, product pages are still delivered as clear-text. However, these clear-text pages are delivered by the same server that handles the encrypted connections at checkout. One server keeps a list of all items added to the shopping cart by clear-text connections, and also processes the encrypted connections at checkout. Thus servers do not have to pass the shopping cart list to other servers at the server farm.

A user begins shopping at an e-commerce site by browsing or searching product description pages. One or more of these pages has an SSL embedded component (such as an image)

that initiates the atomic server-assignment operation. Request 50 to this page with the SSL component is a standard clear-text request. The load-balancer assigns this request to any server using the default server assignment method. In the example, server 1 receives request 50. Server 1 responds with the clear-text page with response 52, which may include several packets such as a response header and content packets. Other packets (not shown) may be exchanged to establish the connection.

Response 52 includes the text of the web page, and references to other components such as graphical images on the page. The client sends additional requests (not shown) for each component on the page and the server responds by sending each component. When the reference for the SSL component is reached as the client parses the page, SSL request 54 is generated to retrieve the SSL component. A new encrypted session is started by the client with SSL request 54. Since SSL request 54 is for a new session and new connection, the load balancer can assign request 54 to any available server. Rather than assign request 4 to server 1, the request is assigned to a different server, server 3.

Server 3 responds by performing the atomic operation. A server-assignment cookie is generated by server 3 that specifies that the assigned server is server 3. A unique SSL session ID is generated by server 3, and response 56 is generated. Response 56 includes the SSL session ID as a clear-text field, but adds the cookie to the data payload which is encrypted. Thus the server assignment in the cookie is encrypted and cannot be read by the load-balancer. Several packets (not shown) may be exchanged between the server and client to exchange keys and certificates as the encrypted session is begun.

The load-balancer reads the SSL session ID from response 56 as it is sent to the client. Afterward, the load-balancer directs all encrypted-session connections with the SSL session ID set by response 56 to server 3.

The client receives response 56 and stores the SSL session ID. This SSL session ID is used by the client for all later encrypted requests to the server, such as SSL request 64. The client also receives the encrypted data payload with the cookie. The client decrypts the data payload and stores the cookie on its local hard disk. This cookie contains the server assignment, telling the load-balancer to send the client's clear-text connections to server 3.

All subsequent clear-text requests from the client to the e-commerce site, such as request 58 for another product-description page, include the cookie with the server assignment. The load-balancer parses request 58 and other packets for such a cookie. The load-balancer reads the server assignment in the cookie and sends request 58 to server 3. Thus all subsequent clear-text request are sent to server 3. The user can browse product web pages and add them to his shopping cart using such clear-text requests. Each request is sent to server 3, so server 3 can keep a local copy of the shopping cart without using a central database.

When the user is ready to check out, encrypted request 64 is sent by the client to the server farm. The SSL session ID is contained in request 64. The load-balancer reads the SSL session ID and searches the SSL table for a match. Since the SSL session ID was loaded into the load-balancer's SSL table earlier by the atomic operation, a matching entry is found. The server assignment is read from the table's matching entry and encrypted request 64 is sent to server 3, the assigned server. Server 3 responds with SSL response 66, which again includes the SSL session ID. A series of SSL request and responses can be used to pass the user's credit card, payment, and shipping information to the server to complete checkout.

The same cookie is returned by this client in all future encrypted connections. However, the load-balancer cannot read the encrypted cookie in these connections. Instead, the load-balancer uses the SSL session ID which is in a clear-text field in all of these encrypted connections. The load-balancer already associates the SSL session ID with a specific server using the SSL table.

The SSL session is typically kept open for several hours before the server times it out. Should the SSL session time out, keys and certificates can again be exchanged and a new SSL session ID assigned. The load-balancer still assigns or sends the next encrypted connection to the same old server. The server then assigns a new SSL session ID to the client, which the load-balancer stores in its SSL table for the new session. Since this is done by the same server, the encrypted session does not move to a different server.

Figure 10:
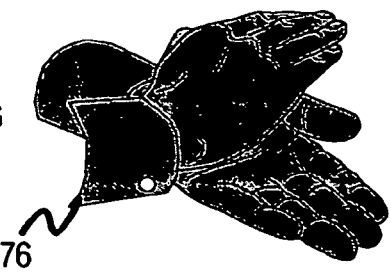
FIG. 10 shows a web page with a hidden SSL image that initiates the atomic server-assignment operation.
Figure 10:
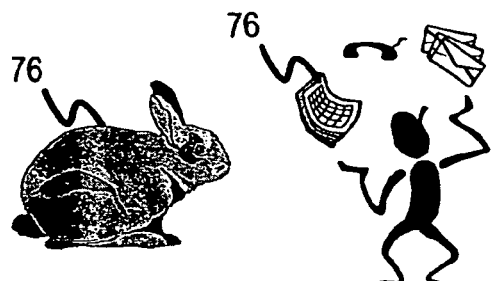
Figure 10:
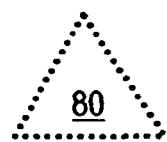

Web Page with Hidden SSL Component—FIG. 10

FIG. 10 shows a web page with a hidden SSL image that initiates the atomic server-assignment operation. The web page shown in FIG. 10 is one of the first web pages displayed to a user, such as the home page or the first product-catalog page displayed to the user.

The web page contains text, web links to other web pages, and references to other embedded components, such as graphic images, using hyper-text mark-up language (html) source code. For example, the web page contains references or URL's to graphic images 76. Once the source code for the web page is downloaded, then separate requests are generated for each of graphics images 76. These graphics images 76 are sent from the server to the client and displayed on the web page to the user.

Other page elements such as box 78 can be included in the web page. Box 78 is a text-entry box where the user can enter key words or text for searching the product catalog. A search is begun when the user hits the enter key after the key words are entered. The user can also click on underlined text or some graphical images that are hyper-links and the displayed web page changes to a new page.

The web page also contains a reference for SSL component 80. SSL component 80 is a hidden embedded image that is not displayed to the user. The source code on the web page specifies that SSL component 80 be retrieved using an SSL encrypted connection. For example, the source code:

<img src="https://www.xyz.com/cgi-bin/state_establish.cgi"> can be included in the web page to start a common-gateway-interface (cgi) script that executes on the server. This cgi script executes the atomic operation, generating the server-assignment cookie and the SSL session ID. The "https" string in the URL specifies that the secure SSL encryption protocol is used to send the image.

Not all web-servers require the use of a special cgi script. Some can be configured to attach a specific cookie to a specified file. In that case, one simply needs to pre-configure the web-server accordingly. A reference such as:

<img src="https://www.xyz.com/images/hidden_image.jpg"> can then be used to retrieve the hidden SSL image file.

The SSL component could be embedded in many different pages, such as all product-catalog pages. The first product page the user views initiates the atomic operation, establishing the encrypted session and generating the server-assignment cookie. When other product pages are requested, the client includes the SSL session ID in the request for the SSL component. The SSL component is then simply transmitted by the server to the client, since the encrypted session is already established. A new SSL session ID is not generated by the server except when no SSL session ID is sent in the request from the client. Thus many pages can have the SSL component embedded.

Modern web-browsers tend to open warning windows when the user exits an encrypted portion of a site. This can be avoided by using the SSL component rather than a whole SSL page. If the encrypted connection requests just a small component of a clear-text web-page, then no warning is generated. Thus using a SSL component rather than a full web page to initiate the atomic server-assignment operation is preferable since the browser warnings are avoided. The SSL component could also be a visible image such as an advertisement, a button, a plug-in, or any other page element which is automatically loaded by the browser.

ADVANTAGES OF THE INVENTION

After the atomic operation has assigned the server, the load-balancer assigns all sessions and connections from a particular client to the same server. Both clear-text connections and encrypted sessions are assigned to the same server. The load-balancer can distribute traffic as evenly as possible among the available servers, but it does not assign clear-text and encrypted connections from one client-encounter to different servers. The load-balancer is ideal for e-commerce web sites since both clear-text and encrypted sessions from one client are assigned to a same server.

After the atomic operation assigns the server, clear-text requests which carry the special cookie are served by the same server that handles the encrypted connections. Only one server must maintain the client data, such as a list of the items added to the shopping cart by clear-text connections. Other servers do not have to share the client data, reducing the local network traffic at the web site or server farm and simplifying web-site architecture. Database sharing is not needed, and the likelihood of crashes and major configuration problems is reduced. Request latency is reduced since the request does not have to wait for the assigned server to poll other servers for parts of the database. A central database is also not needed.

Current load balancers can only persist encrypted sessions. By enabling persistent user sessions consisting of clear-text and encrypted connections, encryption is not necessarily used for product-information pages or other non-critical information. Only financial or personal information such as credit card numbers may be encrypted. This reduces the computational effort required by the servers since fewer encrypted pages are served.

The load-balancer itself does not have to decrypt the messages between the client and server. Thus the load-balancer is not burdened with the computational effort required for decryption. Also, only the client and server need to exchange keys and certificates to establish the encrypted session. This is much simpler that if the load balancer also needed the encryption keys. Also, security is enhanced since only the endpoints have the encryption keys. Middleware such as the load-balancer does not need the keys. Only a 2-party rather than a more complex 3-party encryption scheme is used. Standard encryption software such as SSL version 3 can be used, eliminating the need for proprietary encryption software.

When the proper load-balancer is used, it is possible to implement applications that store client state on the server in a multiple-server web site with very little work. Implementing state migration or database sharing among servers can be very complex, and an alternative site-architecture is also not trivial. This invention makes these very complex redesigns and implementations unnecessary when such an application has to scale up to a multiple-server environment.

Alternate Embodiments

Several other embodiments are contemplated by the inventor. For example, other encryption protocols can be used besides SSL, and other high-level protocols besides HTTP can be used. These protocols may be revised, enhanced, or combined in the future and still apply to the invention. Low-level protocols such as TCP/IP can be modified or replaced with other protocols such as UDP. The invention can be applied to private Intranets or semi-private Extranets. Other networking protocols and other applications may use the invention as well.

The invention is not limited to the world-wide-web or cookies or such. It can be applied to any application that consists of clear-text and encrypted connections and contains a mechanism to persist state data on the client.

The invention could be applied to other middleware. For example, the invention could be used to combine clear-text and encrypted sessions so that a quality-of-service (QoS) router can prioritize all sessions from a particular client application. The image could be hidden by making it very small, such as one by one pixel, and/or making it the same color is the page background.

It is not necessary that all clear-text client connections after the atomic operation must be scheduled to the same server machine. The load-balancer could parse the URL as well, and, if properly configured, could only consider the server-assignment value from the cookie when a specific resource is requested, such as when the server-side program adds to the session state. For the e-commerce example, product-catalog-page requests could be assigned to any server, while requests to add an item to the shopping cart and checkout requests are only handled by the assigned server.

It is not necessary that all connections carry the cookie after the atomic operation. Cookies can be sent by the web-browser only when the request is for a specific resource or a resource within a specific directory on the web-server, which is a standard cookie-feature. For example, assume the catalog pages are in one directory, while the session-state-modifying program is in another directory. The load-balancer could still balance the requests for the catalog browsing across all servers in the site, providing better service to the client. However, all connections that might change the session state would still go to the server assigned by the atomic operation.

A direct association of encrypted connections and clear-text connections is possible if the web-server application is able to encode the SSL session ID in the cookie. However, this requires some modifications to the server software. Without such modifications, such as with a transparent solution as with the described embodiment, it is not possible to directly associate these connections with each other. For the load-balancer this is actually not necessary, since the clear-text and encrypted connections do not really need to be associated with each other. It is sufficient to associate them to the same assigned server. Alternately, server 3 of FIG. 9 could send the SSL session ID and its server number (server 3) to the load-balancer with a command to store it as an entry in the SSL table.

The server-assignment cookie, which encodes the server for the client-encounter, is not limited to just specifying one server machine. It is conceivable that a set of servers is specified. The load-balancer may later choose any of the servers in the set for every new clear-text connection from the client.

This is useful when the set of servers can share session state, such as by using a common file server. The load-balancer is then able to distribute the load among multiple servers within the assigned set. These sets of serves can be geographically diverse, such as when the server farm is a distributed private network in several different cities.

The cookie may contain other information which might be relevant to this client-encounter and may be used by the load-balancer, or even other networking devices or networking software. Information such as for QoS middleware for the session may be included with the cookie.

The server ID could be encoded in the SSL session ID. In that case the load-balancer does not need a SSL session table. However, a modification of the web-server software is then required.

Embodiments may be implemented as a non-transitory and/or tangible computer-readable medium having instructions stored thereon, an article of manufacture including a computer-readable medium having instructions stored thereon, and/or a computer program product. The foregoing description of the embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A system comprising:
a server device configured to:
initiate, in response to a reference to an encrypted component on a clear-text web page comprising an invisible image file, an assignment operation to generate an encrypted-session identifier and a server-assignment cookie having a same server-assignment, and
transmit the encrypted-session identifier and the server-assignment cookie to a client device.

2. The system of claim 1, further comprising a device coupled to the server device, wherein the device is a middleware device or a load-balancer.

3. The system of claim 2, wherein the device is configured to use load-balancing to assign a server to an encrypted-session request in response to receiving the encrypted session request without a corresponding encrypted-session identifier from the client device.

4. The system of claim 3, wherein the device is configured to use the load-balancing by utilizing a random method or a least-used server method.

5. The system of claim 3, wherein the device is configured to generate an entry in an encrypted-session identifier table in response to receiving packets generated by the server device.

6. The system of claim 5, wherein the entry in the encrypted-session identifier table comprises the encrypted-session identifier and a server -assignment field.

7. The system of claim 6, wherein the server-assignment field comprises a server-farm identifier of the server device, a MAC address, or an IP address.

8. The system of claim 2, wherein the device is configured to match a received encrypted-session identifier to the server device using an encrypted-session identifier table and to transmit an encrypted-session request to the server device, in response to receiving the encrypted session request containing the received encrypted session identifier from the client device.

9. The system of claim 2, wherein the device is configured to match a server-assignment in a received server-assignment cookie to the server device and to transmit a clear-text request to the server device, in response to receiving the clear-text request, containing the received server-assignment cookie, for a clear text page from the client device.

10. The system of claim 1, wherein the server-assignment cookie is encrypted before the server device transmits the server-assignment cookie to the client device.

11. The system of claim 1, wherein the server device comprises one or more servers at a web server farm.

12. The system of claim 1, wherein the clear-text web page is part of an electronic commerce website.

13. The system of claim 1, wherein the encrypted-session identifier comprises a secure-sockets layer (SSL) session ID located in a non-encrypted portion of an encrypted connection.

14. A method comprising:
initiating, in response to a reference to an encrypted component on a clear-text web page comprising an invisible image file and using a processing device, a server-assignment operation to generate an encrypted-session identifier and a server-assignment cookie, having a same server-assignment; and
transmitting the encrypted-session identifier and the server-assignment cookie to a client device.

15. The method of claim 14, further comprising:
assigning a server to an encrypted-session request using a load-balancing method in response to a receipt of an encrypted-session request without an encrypted-session identifier by a device coupled to the server.

16. The method of claim 15, further comprising:
generating an entry in an encrypted-session identifier table.

17. The method of claim 14, further comprising:
matching the encrypted-session identifier to a server using an encrypted-session identifier table; and
transmitting an encrypted-session request to the server in response to a receipt, by a device coupled to the server, of an encrypted-session request containing an encrypted-session identifier.

18. The method of claim 14, further comprising:
matching a server-assignment to a server; and
transmitting a clear-text request to the server in response to a receipt, by a device coupled to the server, of a clear-text request for a clear-text page containing a server-assignment cookie.

19. The method of claim 14, further comprising:
suppressing an encrypted session warning by the client device.

20. The method of claim 14, further comprising using a secure-sockets layer (SSL) session ID contained in a non-encrypted portion of an encrypted connection as the encrypted-session identifier.

21. The method of claim 14, wherein the clear-text web page is part of an electronic commerce web site.

22. The method of claim 14, further comprising exchanging encryption keys and certificates between the client device and a server.

23. The method of claim 14, further comprising encrypting the server-assignment cookie before a transmission of the server-assignment cookie to the client device.

24. A system comprising:
means for initiating, in response to a reference to an encrypted component on a clear-text web page comprising an invisible image file, a server-assignment operation to generate an encrypted-session identifier and a server-assignment cookie having a same server-assignment; and
means for transmitting the encrypted-session identifier and the server-assignment cookie to a client device.

25. A non-transitory computer-readable storage medium having instructions stored thereon, the instructions comprising:

instructions to perform, in response to a reference to an encrypted component on a clear-text web page comprising an invisible image file and using a processing device, a server-assignment operation to generate an encrypted-session identifier and a server-assignment cookie having a same server-assignment; and instructions to transmit, using the processing device, the encrypted session-identifier and the server-assignment cookie to a client device.

* * * * *

UNITED STATES PATENT AND TRADEMARK OFFICE
CERTIFICATE OF CORRECTION

PATENT NO. : 7,900,040 B2
APPLICATION NO. : 11/515358
DATED : March 1, 2011
INVENTOR(S) : Brendel It is certified that error appears in the above-identified patent and that said Letters Patent is hereby corrected as shown below:

Title page, item (57), under "Abstract", in Column 2, Line 11, delete "secure-sockets-layer" and insert -- secure-sockets layer --.

Title page, item (57), under "Abstract", in Column 2, Line 16, delete "Client" and insert -- client --.

Title page, item (57), under "Abstract", in Column 2, Line 25, delete "load balancer" and insert -- load-balancer --.

Column 15, Line 54, in Claim 6, delete "server -assignment" and insert -- server-assignment --.

Column 16, Line 20, in Claim 14, delete "cookie," and insert -- cookie --.

Signed and Sealed this
Thirty-first Day of May, 2011

David J. Kappos
*Director of the United States Patent and Trademark Office*